(12) United States Patent
Omsberg et al.

(10) Patent No.: US 11,405,778 B2
(45) Date of Patent: Aug. 2, 2022

(54) USER CONFIDENTIALITY PROTECTION SYSTEM

(71) Applicant: International Business Machines Corporation, Armonk, NY (US)

(72) Inventors: Heather Omsberg, Watertown, MA (US); Robert Huntington Grant, Marietta, GA (US); Jacob Thomas Covell, New York, NY (US); Zachary A. Silverstein, Jacksonville, FL (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 16/796,883

(22) Filed: Feb. 20, 2020

(65) Prior Publication Data
US 2021/0266731 A1 Aug. 26, 2021

(51) Int. Cl.
| H04W 12/00 | (2021.01) |
| H04W 12/033 | (2021.01) |
| G06Q 50/26 | (2012.01) |
| H04B 17/318 | (2015.01) |
| G08B 7/06 | (2006.01) |
| G06N 20/00 | (2019.01) |

(52) U.S. Cl.
CPC ........ *H04W 12/033* (2021.01); *G06Q 50/265* (2013.01); *G08B 7/06* (2013.01); *H04B 17/318* (2015.01); *G06N 20/00* (2019.01)

(58) Field of Classification Search
None
See application file for complete search history.

(56) References Cited

U.S. PATENT DOCUMENTS

| 8,898,783 | B2 | 11/2014 | Chung et al. |
| 9,813,435 | B2 | 11/2017 | Muddu et al. |
| 10,089,462 | B2 | 10/2018 | Touboul |
| 2008/0148346 | A1 | 6/2008 | Gill et al. |
| 2016/0285635 | A1 | 9/2016 | Kolesnikov et al. |
| 2018/0026948 | A1 | 1/2018 | Lazecky et al. |
| 2018/0041546 | A1 | 2/2018 | Gomez et al. |
| 2018/0295148 | A1 | 10/2018 | Mayorgo |
| 2018/0302424 | A1 | 10/2018 | Bender et al. |
| 2019/0108330 | A1 | 4/2019 | Sikder et al. |
| 2019/0130733 | A1* | 5/2019 | Hodge .................. G06V 20/52 |

(Continued)

OTHER PUBLICATIONS

Lagesse et al., "Detecting Spies in IoT Systems using Cyber-Physical Correlation," 2018 IEEE International Conference on Pervasive Computing and Communications Workshops (PerCom Workshops), Mar. 2018, 6 pages. https://faculty.washington.edu/lagesse/publications/HiddenSensorDetection.pdf.

(Continued)

*Primary Examiner* — William J. Goodchild
(74) *Attorney, Agent, or Firm* — Yee & Associates, P.C.

(57) ABSTRACT

A method, computer system, and computer program product for protecting user confidentiality. Signal transmissions in a location in which a user is present are monitored by a computer system. A set of recording devices in an active state for recording the user in the location is identified by the computer system based on patterns in the signal transmissions monitored in the location. A set of alerts notifying the user of the set of recording devices in the active state for recording the user is generated by the computer system.

18 Claims, 6 Drawing Sheets

(56) References Cited

U.S. PATENT DOCUMENTS

2019/0132347 A1 5/2019 Wakid
2019/0159035 A1 5/2019 Town et al.

OTHER PUBLICATIONS

Munjal, "Communication(Wireless) Protocols in IOT," Medium, published Nov. 27, 2017, accessed May 10, 2022, 16 pages. https://medium.com/@hardymunjal/communication-wireless-protocols-in-iot-7da097ebbe96.

Rberlia, "Connectivity of the Internet of Things," SparkFun, published Jan. 5, 2015, accessed May 10, 2022, 24 pages. https://learn.sparkfun.com/tutorials/connectivity-of-the-internet-of-things/all.

Doctorow, "IoT Inspector: Princeton releases a tool to snoop on home IoT devices and figure out what they're doing," Boing Boing, published Apr. 23, 2018, accessed May 10, 2022, 10 pages. https://boingboing.net/2018/04/23/promiscuous-mode.html.

\* cited by examiner

USER CONFIDENTIALITY PROTECTION SYSTEM

BACKGROUND

1. Field

The disclosure relates generally to an improved computer system and, more specifically, to a method, apparatus, computer system, and computer program product for reducing unauthorized recording of users.

2. Description of the Related Art

Internet-of-Things (IoT) devices are devices that have connectivity to a network such as the Internet. For example, smart phones can communicate with other smart phones. As another example, video cameras and other recording devices can communicate over the Internet. IoT devices with this connectivity can collect and transmit data. This increased presence of IoT devices raises concerns about data security when people travel to different locations in which IoT devices are present. Maintaining security and confidentiality of information with IoT devices in these and other locations are an important concern with respect to data security.

SUMMARY

According to one embodiment of the present invention, a method protects user confidentiality. Signal transmissions in a location in which a user is present are monitored by a computer system. A set of recording devices in an active state for recording the user in the location is identified by the computer system based on patterns in the signal transmissions monitored in the location. A set of alerts notifying the user of the set of recording devices in the active state for recording the user is generated by the computer system.

According to another embodiment of the present invention a recording detection system comprises a computer system that monitors signal transmissions in a location in which a user is present. The computer system identifies a set of recording devices in an active state for recording the user in the location based on patterns in the signal transmissions monitored in the location and generates a set of alerts notifying the user of the set of recording devices in the active state for recording the user.

According to yet another embodiment of the present invention, a computer program product for protecting user confidentiality comprises a computer-readable storage media with first program code, second program code, and third program code stored on the computer-readable storage media. The first program code is executable by a computer system to cause the computer system to monitor signal transmissions in a location in which a user is present. The second program code is executable by the computer system to cause the computer system to identify a set of recording devices in an active state for recording the user in the location based on patterns in the signal transmissions monitored in the location. The third program code is executable by the computer system to cause the computer system to generate a set of alerts notifying the user of the set of recording devices in the active state for recording the user.

DETAILED DESCRIPTION

Figure 1:
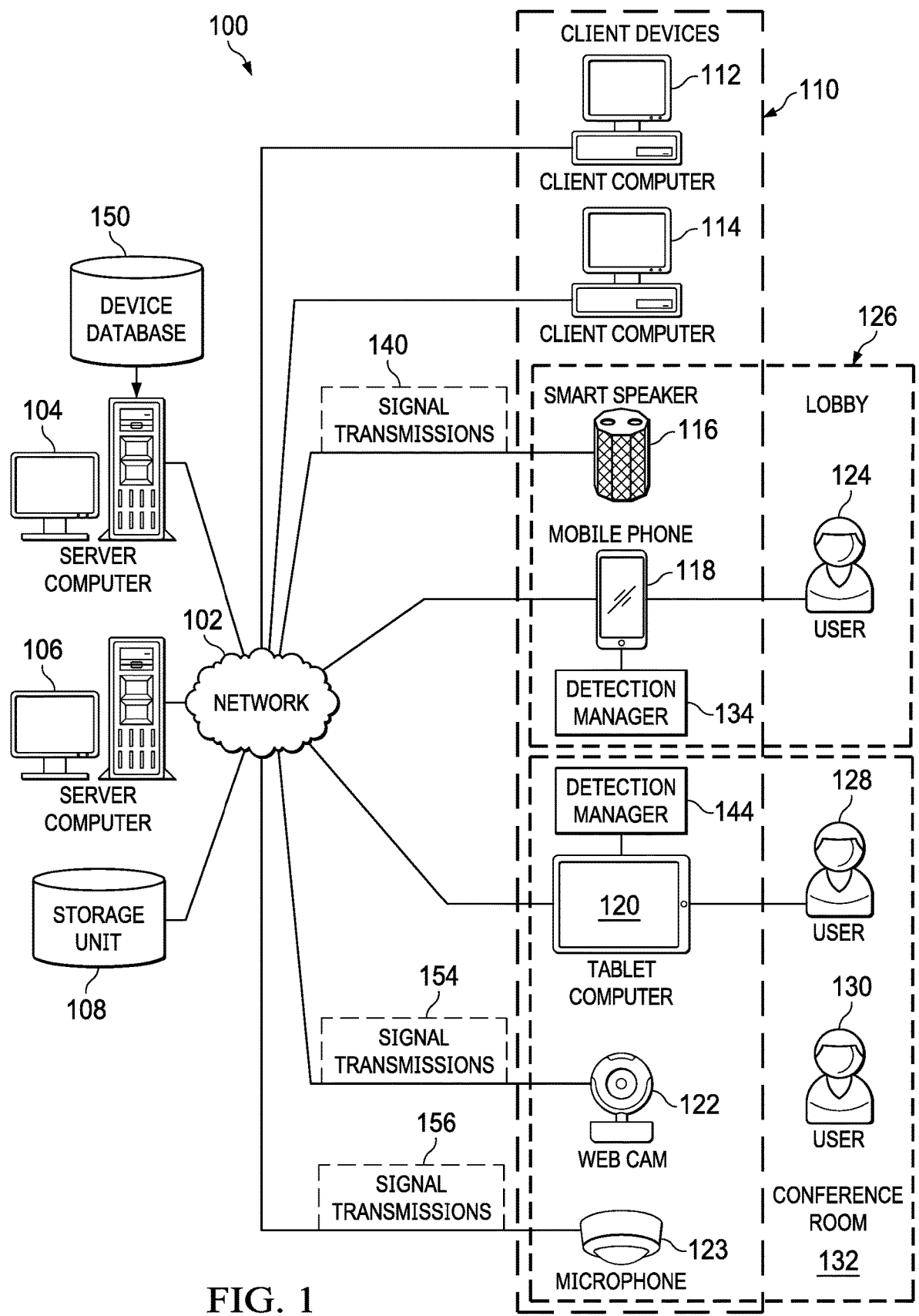
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Illustrative embodiments recognize and take into account a number of different considerations. For example, the illustrative embodiments recognize and take into account that users may be concerned with recording devices such as Internet-of-Things (IoT) devices that are capable of recording information while a user is working, reading emails, drafting a document, attending a meeting, talking to a colleague in person, talking to a coworker on a video conference, or other actions from which information can be recorded by an Internet-of-Things device that is sufficiently close or positioned to record information where the user is located. The illustrative embodiments recognize and take into account that it would be desirable to have a solution that can notify the user that the user is being recorded in the location in which the user is located. The illustrative embodiments recognize and take into account that this type of notification can enable a user to change their behavior to reduce or minimize unauthorized recording.

Thus, the illustrative embodiments provide a method, apparatus, system, and computer program product for protecting user confidentiality. In one illustrative example, a computer system monitors data transmitted in a location in which a user is present. The computer system identifies a set of recording devices that are recording or likely to record the user in the location based on patterns in the data. The computer system generates a set of alerts notifying the user of the set of recording devices that are recording or likely to record the user in the location.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112 and client computer 114. Client devices 110 can be, for example, computers, workstations, or network computers. In the depicted example, server computer 104 provides information, such as boot files, operating system images, and applications to client devices 110. Further, client devices 110 can also include other types of client devices such as smart speaker 116, mobile phone 118, tablet computer 120, web cam 122, and microphone 123. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 is located in lobby 126. User 124 carries mobile phone 118 and uses mobile phone 118 to make a call. Detection manager 134 can determine whether user 124 is being recorded during the call being made by user 124. Recording of user 124 may reduce the level of confidentiality that user 124 expects in making the call in lobby 126.

Detection manager 134 is located in mobile phone 118. In the illustrative example, detection manager 134 can be a software application, module, firmware, or other component installed in mobile phone 118 for managing confidentiality for user 124.

Detection manager 134 monitors signal transmissions in the location of user 124, which is lobby 126 in this illustrative example. In this illustrative example, smart speaker 116 is connected to network 102 through a wireless connection. As a result, smart speaker 116 transmits signal transmissions 140 through wireless signals. These wireless signals can be detected by at least one of a wireless device in network 140 or mobile phone 116.

In the illustrative example, detection manager 134 can determine signal strengths in identifying data for signal transmissions 140 detected in lobby 126 as part of monitoring signal transmissions 140. The signal strengths can be measured based on signals transmissions received by at least one of mobile phone 118 or a wireless device in network 102. The signal strengths can be used to determine a distance from smart speaker 116 to mobile phone 118. Further, the signal strengths can also be measured at a router or a wireless port in network 102.

Further, detection manager 134 can identify that the recording device transmitting signal transmissions 140 is smart speaker 116 from signal transmissions 140. This identification can be made by detection manager 134 accessing device database 150 located in server 104. For example, signal transmissions 140 may include metadata containing media access identifier addresses. Recording devices can be associated with media access control (MAC) addresses recorded in device database 150. Other types of device identifiers can be present in signal transmissions 140 that identify a type of recording device or uniquely identify a recording device. Other information includes a device, a model, or other suitable information.

As another example, patterns in signal transmissions 140 may be used to identify a particular type of recording device. These patterns can be compared to historical patterns derived from the storable signal transmissions in device database 150 to identify the type of recording device or uniquely identify a particular recording device. The historical patterns can include, for example, at least one of patterns of data, times at which the patterns of data were transmitted, signal type, signal strength prior to transmission of data, signal strength after the transmission of data, signal strength during the transmission of data, traffic flow, or other suitable characteristics from which patterns can be determined. The comparison of patterns in signal transmissions 140 with the historical patterns in device database 150 can be used to determine that signal transmissions 140 are transmitted by a particular type of device such as smart speaker 116.

As depicted, detection manager 134 can also determine the state of smart speaker 116. For example, detection manager 134 can determine whether smart speaker 116 is in an active state in which smart speaker 116 is likely to record user 124 or is recording user 124 by analyzing signal transmissions 140 transmitted by smart speaker 116. For example, detection manager 134 can identify and analyze patterns in signal transmissions 140 to determine whether smart speaker 116 is in an active state.

The location of smart speaker 116 can also be determined by detection manager 134 from signal transmissions 140. In this illustrative example, a wireless connection is used by smart speaker 116 to transmit signal transmissions 140.

A wireless device in network 102 receiving signal transmissions 140 can provide information to determine the location of smart speaker 116. Signal transmissions 140 can also be detected by detection manager 134 in mobile phone 118. The signal strengths of signal transmissions 140 from one or both of these devices can be used to determine the location of smart speaker 116 relative to mobile phone 118. For example, when the location of both mobile phone 118 and the wireless device is known, the locations of these devices and the distance to smart speaker 116 can be determined from signal strengths. Triangulation is used to determine the location of smart speaker 116.

In another example, smart speaker 116 can be connected to network 102 through a wired network connection to a network port in lobby 126. The location of this particular network port can be used to determine that the location of smart speaker 116 is in lobby 126.

Additionally, detection manager 134 can determine the recording capabilities of smart speaker 116 from device database 150. Device database 150 can include information describing recording capabilities of recording devices. In this illustrative example, device database 150 includes information relating to a microphone in smart speaker 116. For example, the information can be that the microphone in smart speaker 116 has a limit of 10 dB for recording sounds.

In response to smart speaker 116 being in an active state, detection manager 134 can generate an alert notifying user 124 that smart speaker 116 is in an active state and user 124 may not have a desired level of confidentiality for the call being made by user 124 in lobby 126. The alert can be displayed by detection manager 134 on mobile phone 118 to user 124. In this manner, user 124 may take action such as speaking more softly or moving to another location for the call.

In another example, user 128 and user 130 are located in conference room 132. In this illustrative example, user 128 operates tablet computer 120 to display a presentation to user 130. Detection manager 144 is located in tablet computer 120 belonging to user 128. In this example, user 128 discusses the presentation displayed on tablet computer 120 with user 130 in conference room 132.

As depicted, web cam 122 is located in conference room 132. Further, microphone 123 is located in the ceiling of conference room 132. In this illustrative example, conference room 132 has a wall common with lobby 126 in which smart speaker 116 is located.

In this illustrative example, detection manager 144 can determine the location of web cam 122 from signal transmissions 154 from web cam 122 and the location of microphone 123 from signal transmissions 156 from microphone 123. In this example, these signal transmissions are sent using wireless signals. From monitoring signal transmissions 154 and signal transmissions 156, detection manager 144 can determine that web cam 122 and microphone 123 are located in conference room 132 with user 128 and user 130. Further, from monitoring signal transmissions 140, detection manager 134 also determines that smart speaker 116 is located in lobby 126 adjacent to conference room 132.

In this illustrative example, detection manager 144 can analyze at least one of data or signal strengths for the signal transmissions from these recording devices to determine whether these recording devices are in an active state. The signal transmissions can be analyzed to determine a state of these recording devices.

In this illustrative example, the alert can be generated when at least one of signal transmissions 140, signal transmissions 154, or signal transmissions 156 indicates one or more recording devices are in an active state.

In this illustrative example, web cam 122, microphone 123, and smart speaker 116 are determined by detection manager 144 to be in an active state. Detection manager 134 generates an alert indicating that web cam 122, microphone 123, and smart speaker 116 are present. This alert also may provide a suggestion such as positioning tablet computer 120 such that information displayed on tablet computer 120 cannot be recorded by web cam 122. Additionally, the alert can also include a suggestion to lower the level of voices in the conversation between user 128 and user 130 to avoid recording by microphone 123 and smart speaker 116.

In this illustrative example, smart speaker 116 is not in the location of user 128 and user 130 in conference room 132. However, based on the capabilities of smart speaker 116 determined by using device database 150, smart speaker 116 is capable of recording the users in conference room 132. In other words, a recording device does not have to be in the same location as a user but can be sufficiently close to the user to record the user. As depicted, in this illustrative example, locations are based on physical rooms or partitions. In other illustrative examples, the locations can be based on distances from a user or a boundary around the user that does not depend on physical structures.

In other examples, a device in a same location as a user may not be able to record the user because of the capabilities of the device. For example, web cam 122 is not likely to record the presentation displayed on tablet computer 120 operated by user 128 if tablet computer 120 is not within the field of view of web cam 122. If the determination can be made that web cam 122 is unable to record user 128, user 130, and tablet computer 120, then the alert does not need to include the identification of web cam 122.

Thus, detection manager 134 and detection manager 144 are configured to notify when a user is being recorded through monitoring transmissions of devices in a network. Detection managers can be used to determine the locations of devices relative to users.

In this example, detection manager 134 is located in mobile phone 118 and detection manager 144 is located in tablet computer 120. In other illustrative examples, a detection manager for these devices can be located remotely such as in server computer 104. In other illustrative examples, a detection manager can be distributed as a server client process in which the server portion is located in server computer 104 and the client portion can be located in client devices such as mobile phone 118 for user 124 or tablet computer 124 for user 128.

Figure 2:
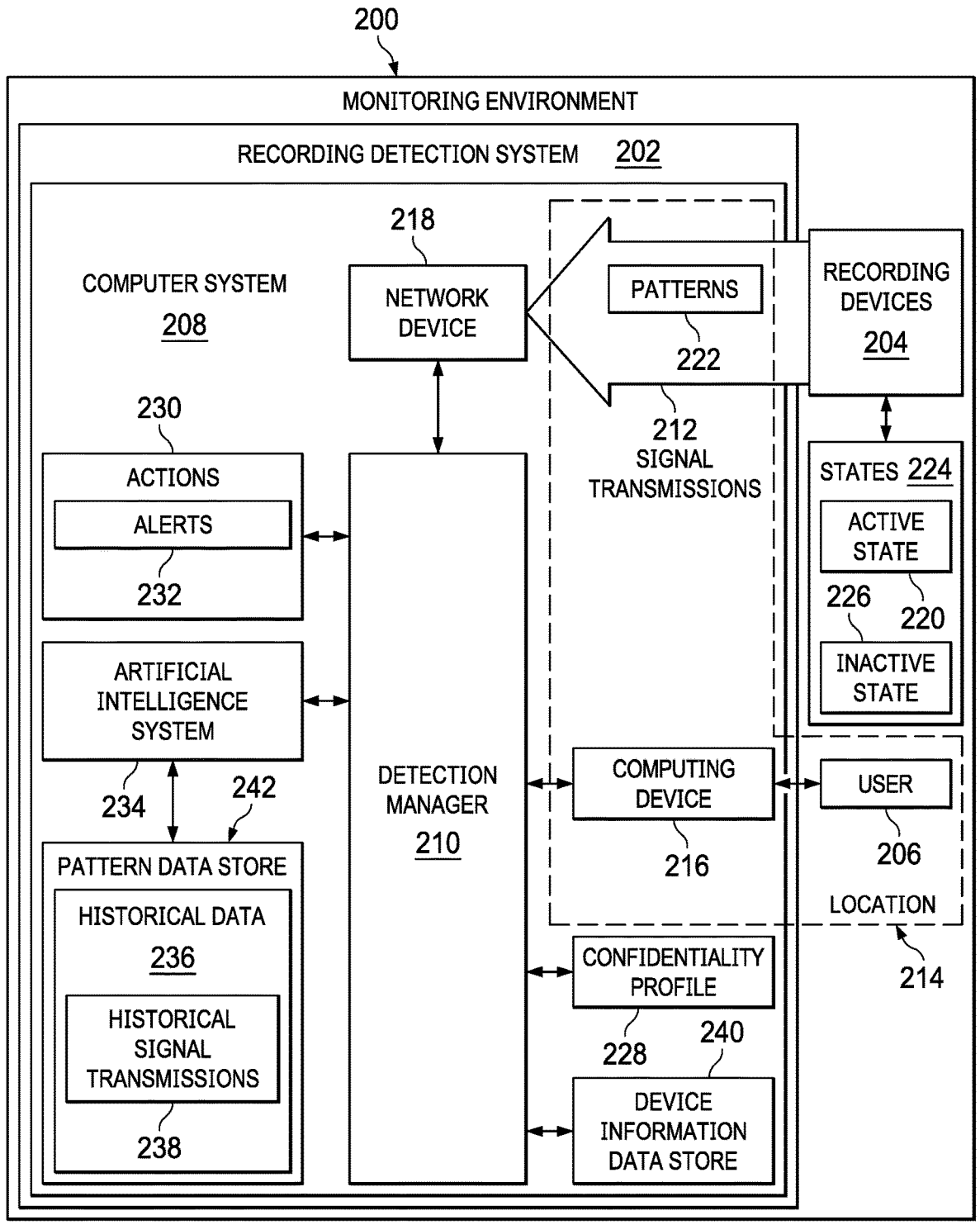
FIG. 2 is a block diagram of a monitoring environment in accordance with an illustrative embodiment.

With reference now to FIG. 2, a block diagram of a monitoring environment is depicted in accordance with an illustrative embodiment. In this illustrative example, monitoring environment 200 includes components that can be implemented in hardware such as the hardware shown in network data processing system 100 in FIG. 1.

Recording detection system 202 in monitoring environment 200 can operate to determine whether recording devices 204 are in an active state such that user 206 may not have a desired level of confidentiality. In the illustrative example, recording devices 204 can be selected from at least one of an Internet-of-Things device, a video capture device, an audio capture device, a microphone, a mobile phone, a laptop computer, a table computer, a Raspberry Pi computer, a camera, a web cam, a smart speaker, a smart television, a smart sensor, or some other suitable device.

In the illustrative example, recording detection system 202 includes a number of different components. As depicted, recording detection system 202 comprises computer system 208 and detection manager 210. Detection manager 210 is located in computer system 208 in this illustrative example.

Detection manager 210 can be implemented in software, hardware, firmware, or a combination thereof. When software is used, the operations performed by detection manager 210 can be implemented in program code configured to run on hardware, such as a processor unit. When firmware is used, the operations performed by detection manager 210 can be implemented in program code and data and stored in persistent memory to run on a processor unit. When hardware is employed, the hardware may include circuits that operate to perform the operations in detection manager 210.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

In this illustrative example, detection manager 210 operates to protect user confidentiality for user 206. Detection manager 210 in computer system 208 can operate to monitor a set of signal transmissions 212 in location 214 in which user 206 is present.

The set of signal transmissions 212 can take a number of different forms. For example, a signal transmission can be at least one of a wireless signal, an optical signal, or electrical signals. A wireless signal can take various forms such as a radio frequency signal, a Bluetooth signal, a Wi-Fi signal, an infrared signal, or some other suitable type of wireless signal that can be used to transmit information. Bluetooth is a trademark of Bluetooth SIG. The optical signal can be, for example, a wireless signal or a fiber optic signal propagating through a fiber optic cable. Electrical signals can propagate an Ethernet cable, a coaxial cable, a twisted pair, or other suitable types of signal transmission media suitable for electrical signals. For example, detection manager 212 can monitor at least one of signal strengths of signal transmissions 212 or data in signal transmissions 212 monitored in location 214 in which user 206 is present.

In this illustrative example, detection manager 210 monitors signal transmissions 212 that can be detected in location 214. These signals can be monitored by detection manager 210 using at least one of computing device 216, network device 218 in computer system 208, or some other device that can receive signal transmissions 212 in location 214.

As depicted, location 214 is an area in which user 206 is located. Location 214 can take a number of forms. For example, location 214 can be a room, an office, a model, or an area. The area may not be defined using physical boundaries such as walls. Instead, the area can be a circle with the radius extending from computing device 216 for user 206. In another example, the area can be a rectangle, a square, a pentagon, an irregular shape, or some other shape in which computing device 216 for user 206 is located. In yet other examples, location 214 can be defined as a volume.

In the illustrative example, detection manager 210 can operate to identify a set of recording devices 204 in active state 220 for recording user 206 in location 204 based on patterns 222 in signal transmissions 212 monitored in location 214. The set of recording devices 204 can be one or more of recording devices 204. In this illustrative example, the set of recording devices 204 can be in location 214 or may not be in location 214. For example, one or more recording devices 204 can be in location 214 or in another location. Signal transmissions 212 for recording devices 204 are monitored in location 214.

In this illustrative example, a recording of user 206 can be any information about user 206 that can be recorded. This information can include at least one of audio, an image, a video, a biometric parameter such as body temperature or heart rate, or other suitable information. As used herein, the recording of user 206 can also include recording information about computing device 216 used by user 206. For example, the recording can include recording a display of information or audio from computing device 216.

In the illustrative example, patterns 222 can include patterns for at least one of data, data types, timing of signal transmissions 212, signal strengths or signal transmissions 212, ports used by a recording device, port availability, or other suitable information derived from monitoring signal transmissions 212.

Patterns 222 can be compared to historical data 236 in pattern data store 242. Pattern data store 242 is a repository of data patterns that can be used to identify when a recording device that is in active state 220 is present from patterns 222. Pattern data store 242 can be created using prior signal transmissions for recording devices in computer system 208 when the recording devices are known to be in active state 220.

Additionally, monitoring can be performed for many users in many locations such that the monitored signal transmissions that form historical signal transmissions 238 include information about recording devices from one or more networks. Pattern data store 246 can be a crowd-sourced data in which historical signal transmissions 238 are from many users in many locations.

For example, the set of recording devices 204 can be identified by detection manager 210 identifying recording devices 204 from signal transmissions 212 monitored in location 214. Detection manager 210 can determine states 224 for recording devices 204 identified using patterns 222 in signal transmissions 212.

As depicted, states 224 comprise active state 220 and inactive state 226. In this illustrative example, active state 220 can mean that patterns 222 indicate that a particular device is recording, ready to record, or preparing to record. Inactive state 226 means that a recording device is not preparing to record, ready to record, or is recording.

Detection manager 210 can identify the set of recording devices 204 from recording devices 204 based on states 224 determined for recording devices 204 in which the set of recording devices 204 has active state 220 for recording.

This determination of the set of recording devices 204 can also be based on confidentiality profile 228 for user 206. Confidentiality profile 228 can be used to determine when confidentiality is desired by user 206. For example, confidentiality profile 228 can specify at least one of a location, a computing device, a sensitive data type designation, a website, a permission for recording by a recording device, a type of recording permitted by a type of recording device, or other parameters that can be used to determine when a recording device in active state 220 should be included in the set of recording devices 204.

For example, when user 206 is in a public location browsing a news website on a mobile phone, a recording device such as a web cam that can capture images or video of the display of the mobile phone may not be considered a recording device to be included in the set of recording devices 204. In contrast, when user 206 is in a conference room viewing work email messages, a web cam in the conference room can be identified as part of the set of recording devices 204 with an alert being generated when the web cam is in active state 220.

Further, in determining the set of recording devices 204 in active state 220, detection manager 210 can also consider capabilities of recording devices 204. The capabilities of recording devices 204 can be determined from device information data store 240, which includes information about recording devices 204. This information can include at least one of a manufacturer, a type, a model, a device location, data transmission patterns, signal strength patterns, a type of sensor, recording capabilities, a microphone sensitivity, a device orientation, a location, or other information that can be used to determine the capabilities of a recording device to record information.

For example, a microphone identified in recording devices 204 transmitting signal transmissions 212 in location 214 can be in active state 220. However, based on the microphone sensitivity, the microphone may be unable to record user 206 depending on the voice level of user 206. As a result, a recording device in active state 220 may not be included in the set of recording devices 204 in active state 220 when the recording device is unable to record user 206. In other words, the recording device may not be able to generate a recording of user 206 that includes any information that is used for unapproved purposes.

Detection manager 210 can perform a number of actions 230 in response to a set of recording devices 204 in active state 220 that is recording or likely to record user 206 in location 214. A device recording user 206 may or may not be transmitting data from recording. Data generated by the recording of user 206 can be transmitted while recording or at some time after recording.

The number of actions can include generating a set of alerts 232 notifying user 206 of the set of recording devices 204 in active state 220 for recording user 206. The set of alerts 232 can comprise at least one of a visual alert, an audio alert, or displaying an alert on a device associated with the user in the location. The set of alerts 232 can also include at least one of a device identifier, an adjacency level, a predicted content type recorded, a security certificate, or a validation certificate for each recording device in the set of recording devices. The set of alerts 232 is a set of real-time alerts that can be generated as soon as the set of recording devices 204 has been identified.

The set of alerts 232 can also include suggested actions to counteract recording of user 206. For example, wherein the set of alerts 232 includes a set of suggested actions selected from at least one of moving to another room, reducing a volume in talking, covering a camera in a recording device, disconnecting the recording device from a power source, or some other suitable action. As a result, user 206 can quickly take one or more of actions 230 to reduce undesirable recording of user 206.

In another illustrative example, detection manager 210 can initiate an action in the number of actions 230 to counteract the set of recording devices 204 in active state 220. For example, detection manager 210 can prevent a recording device in the set of recording devices 204 from transmitting data. For example, detection manager 210 can initiate a signal jamming process for wireless signals. In another illustrative example, an Ethernet port in a switch used by the recording device can be disabled. In yet another illustrative example, detection manager 210 can generate modulate outputs to prevent the set of recording devices 204 from recording user 206. For example, sound can be a module in a manner to cause a noise canceling effect for conversation by user 206.

In this illustrative example, user 206 can subscribe to services provided by detection manager 210. This registration can include downloading software or otherwise identifying a computing device for user 206. The computing device can be, for example, a mobile phone, a tablet computer, a laptop computer, smart glasses, a desktop computer, or some other device.

In this illustrative example, detection manager 210 uses artificial intelligence system 234 in detecting the set of recording devices 204. As depicted, artificial intelligence system 234 is a system that has intelligent behavior and can be based on the function of a human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system. In one illustrative example, artificial intelligence system 234 can include a set of machine learning models that are trained to at least one of identify a recording device, determine whether a recording device is in an active state, determine what alert to create, or what suggestions to make.

In this illustrative example, artificial intelligence system 234 can monitor signal transmissions 212 and identify the set of recording devices 204 in active state 220. This training can be formed using historical data 236 including historical signal transmissions 238 from recording devices 204. With training, artificial intelligence system 234 can analyze patterns 222 in signal transmissions 212 monitored in location 214 and identify the set of recording devices 204 in active state 220.

In one illustrative example, one or more technical solutions are present that overcome a problem with recording devices recording a user without permission or knowledge of the user. As a result, one or more technical solutions may provide a technical effect of maintaining desired confidentiality for users through monitoring signal transmissions in a location in which a user is located.

Computer system 208 can be configured to perform at least one of the steps, operations, or actions described in the different illustrative examples using software, hardware, firmware, or a combination thereof. As a result, computer system 208 operates as a special purpose computer system in which detection manager 210 in computer system 208 enables protecting user confidentiality. In particular, detection manager 210 transforms computer system 208 into a special purpose computer system as compared to currently available general computer systems that do not have detection manager 210.

In the illustrative example, the use of detection manager 210 in computer system 208 integrates processes into a practical application for protecting user confidentiality. In other words, detection manager 210 in computer system 208 is directed to a practical application of processes integrated into detection manager 210 in computer system 208 that monitors signal transmissions in a location in which a user is present; identifies a set of recording devices active state; and generates a set of alerts to notify the user of the set of active state. In this illustrative example, detection manager 210 in computer system 208 analyzes the signal transmissions and identifies patterns that can be compared to a history of patterns or input into an artificial intelligence system to identify which recording devices are in an active state. When one or more recording devices in an active state are detected by detection manager 210, a number of actions including generating an alert can be performed to reduce the likelihood that a user will be recorded without permission.

The illustration of monitoring environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, detection manager 210 can be located in a number of different places within computer system 208. For example, detection manager 210 can be implemented as at least one of software or hardware in computing device 216 used by user 206. In another illustrative example, detection manager 210 can be located in network device 218. In yet other illustrative examples, detection manager 210 can be located in a server computer and computing device 216 to provide confidentiality services to user 206 using a server client architecture.

Further, although artificial intelligence system 234 is shown as a separate component from detection manager 210, artificial intelligence system 210 can be implemented as part of detection manager 210.

Figure 3:
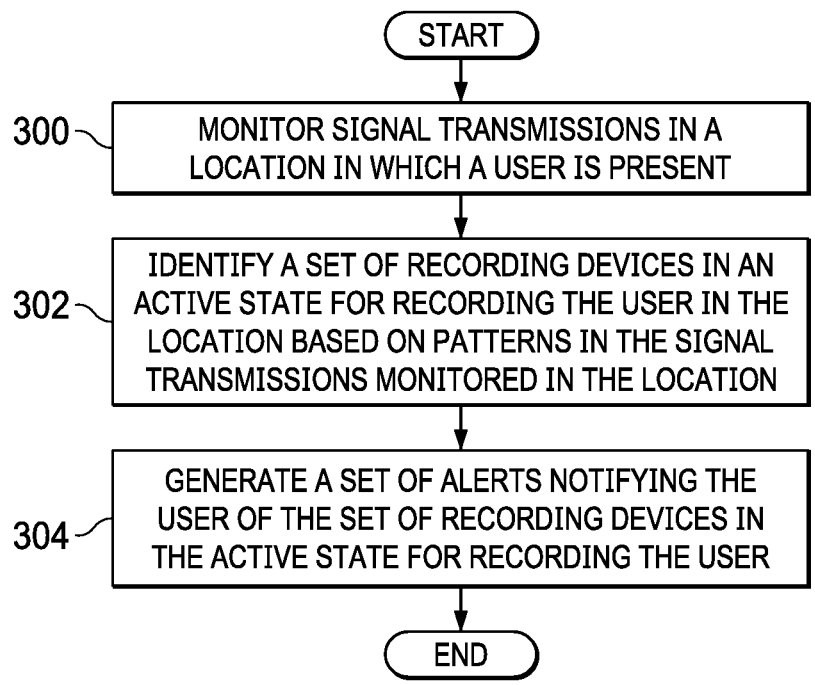
FIG. 3 is a flowchart of a process for protecting user confidentiality in accordance with an illustrative embodiment.

Turning next to FIG. 3, a flowchart of a process for protecting user confidentiality is depicted in accordance with an illustrative embodiment. The process in FIG. 3 can be implemented in hardware, software, or both. When implemented in software, the process can take the form of program code that is run by one or more processor units located in one or more hardware devices in one or more computer systems. For example, the process can be implemented in detection manager 210 in computer system 208 in FIG. 2.

The process begins by monitoring signal transmissions in a location in which a user is present (step 300). In step 300, the monitoring of the signal transmissions can include monitoring at least one of signal strengths of the signal transmissions or data in the signal transmissions monitored in the location in which the user is present.

The process identifies a set of recording devices in an active state for recording the user in the location based on patterns in the signal transmissions monitored in the location (step 302). An indication of the set of recording devices in step 302 can be performed by comparing the patterns to a history of patterns. This comparison can be performed by an artificial intelligence system.

The process generates a set of alerts notifying the user of the set of recording devices in the active state for recording the user (step 304). The process terminates thereafter.

Figure 4:
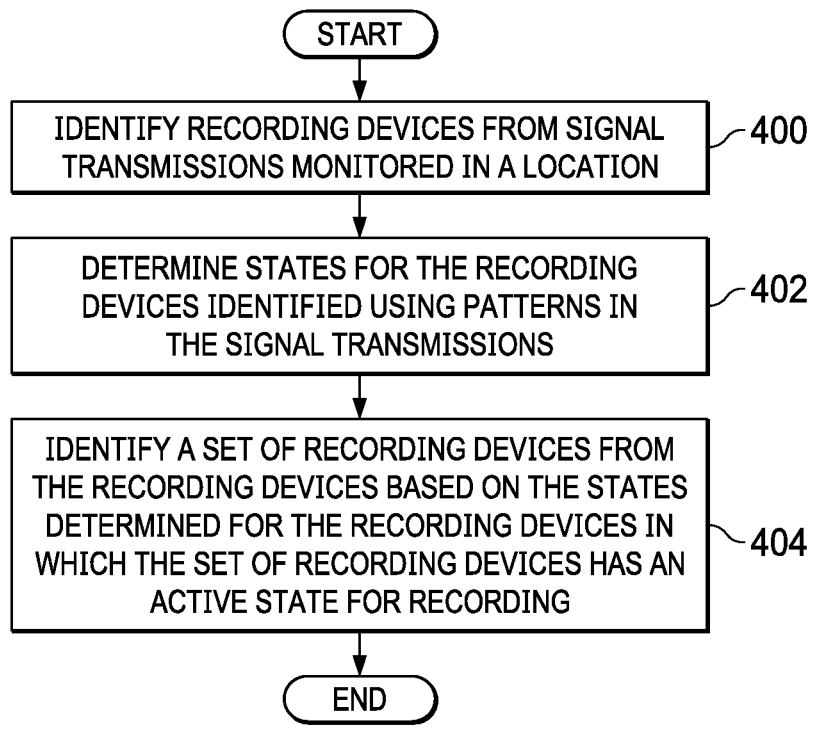
FIG. 4 is a flowchart of a process for identifying a set of recording devices in an active state in accordance with an illustrative embodiment.

With reference next to FIG. 4, a flowchart of a process for identifying a set of recording devices in an active state is depicted in accordance with an illustrative embodiment. The process illustrated in FIG. 4 is an example of one manner in which step 302 in FIG. 3 can be implemented.

The process begins by identifying recording devices from signal transmissions monitored in a location (step 400). The process determines states for the recording devices identified using patterns in the signal transmissions (step 402).

The process identifies a set of recording devices from the recording devices based on the states determined for the recording devices in which the set of recording devices has an active state for recording (step 404). In step 402, the set of recording devices can be one or more of the recording devices monitored in the signal transmissions. In one illustrative example, the set of recording devices can be all of the recording devices monitored in the signal transmissions. The process terminates thereafter.

Figure 5:
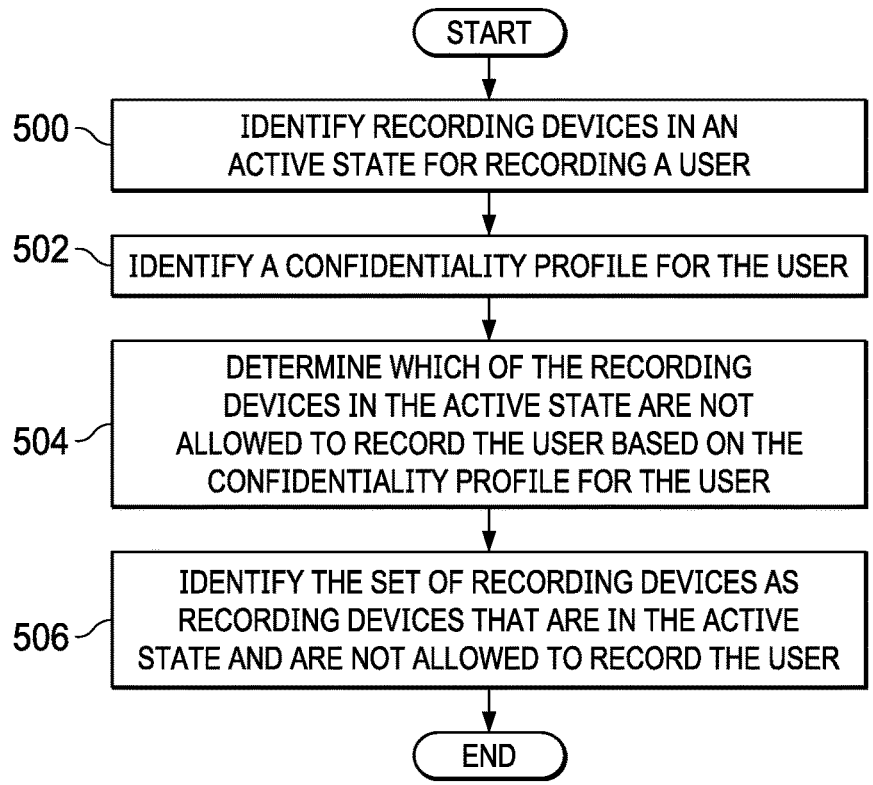
FIG. 5 is a flowchart of a process for identifying a set of recording devices in accordance with an illustrative embodiment.

Turning now to FIG. 5, a flowchart of a process for identifying a set of recording devices is depicted in accordance with an illustrative embodiment. The process illustrated in FIG. 5 is an example of one manner in which step 404 in FIG. 4 can be implemented.

The process begins by identifying recording devices in an active state for recording a user (step 500). The process identifies a confidentiality profile for the user (step 502). The process then determines which of the recording devices in the active state are not allowed to record the user based on the confidentiality profile for the user (step 504). The process identifies the set of recording devices as recording devices that are in the active state and are not allowed to record the user (step 506). The process terminates thereafter.

Figure 6:
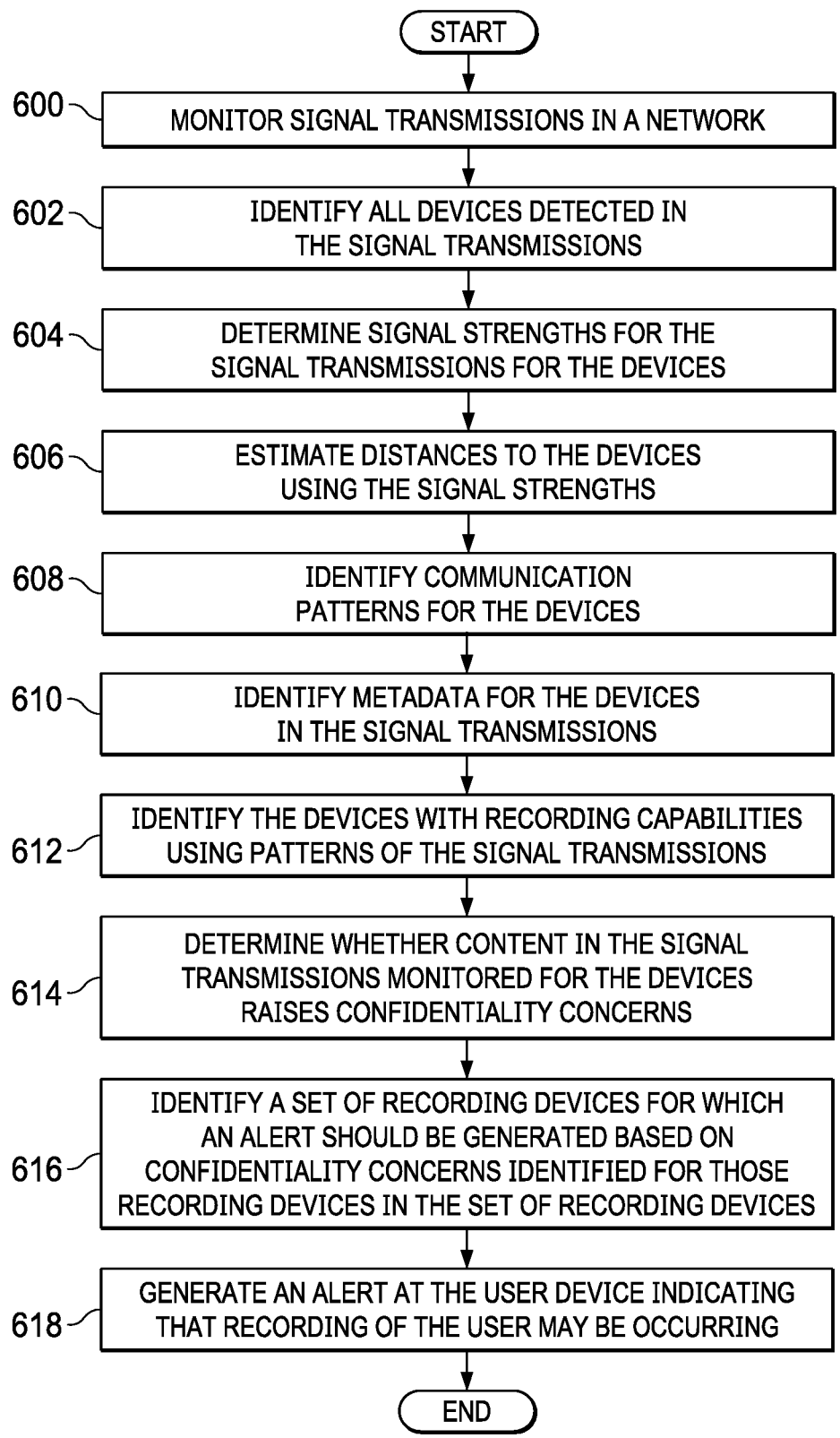
FIG. 6 is a flowchart of a process for protecting user confidentiality in accordance with an illustrative embodiment.

In FIG. 6, a flowchart of a process for protecting user confidentiality is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in detection manager 210 in computer system 208 in FIG. 2. In this example, detection manager 210 can be software installed in a user device, such as computing device 216 in FIG. 2.

The process begins by monitoring signal transmissions in a network (step 600). In step 600, the process monitors signal transmissions in wireless signal transmissions selected from at least one of Bluetooth transmissions, Wi-Fi transmissions, near field communications (NFC) transmissions, radio frequency (RF) transmissions, optical signal transmissions, or other types of signal transmissions.

The process identifies all devices detected in the signal transmissions (step 602). The process determines signal strengths for the signal transmissions for the devices (step 604). In step 604, the signal strengths can be with respect to the user device, a network device, or both the user device and the network device.

The process estimates distances to the devices using the signal strengths (step 606). When a distance is estimated to both a network device and a user device, the locations of the devices can be determined using triangulation.

The process identifies communication patterns for the devices (step 608). The process identifies metadata for the devices in the signal transmissions (step 610). The metadata can be, for example, at least one of a user identifier (UID), a device name, a make, a model, broadcasts, or other information about the devices.

The process identifies the devices with recording capabilities using patterns of the signal transmissions (step 612). These devices are recording devices. In step 612, the recording devices transmitting data are in an active state.

The process determines whether content in the signal transmissions monitored for the devices raises confidentiality concerns (step 614). In this example, the process assumes that the recording devices are transmitting data. The type of data can be, for example, at least one of audio data, video data, or other types of data that may be confidential or sensitive. The pattern of the content and the content itself can be analyzed to determine whether information in the content is of a sensitive nature. For example, words in a document or words spoken by a user in audio data can be analyzed to determine whether particular words or terms raise confidentiality concerns. As another example, signal strengths can have a pattern that may indicate that a particular device is operating to output recorded data.

The process then identifies a set of recording devices for which an alert should be generated based on confidentiality concerns identified for those recording devices in the set of recording devices (step 616). The set of recording devices is based on the types of data.

The process generates an alert at the user device indicating that recording of the user may be occurring (step 618). In this illustrative example, the alert can include a device identifier, an adjacency level, a predicted content type recorded, a security certificate or validation certificate for a recording device, and one or more suggestions for increasing confidentiality. The device identifiers can be used to indicate what devices are recording devices subject to the alert. For example, the device identifier can be, for example, web cam 122 in conference room 132 in FIG. 1. The adjacency level of the device can identify a distance of the device from the user. The adjacency level can be an actual distance for a number indicating a relative distance of the recording device to the user. The security certificates and validation certificates can be used to determine whether the user should be concerned about being recorded.

Figure 7:
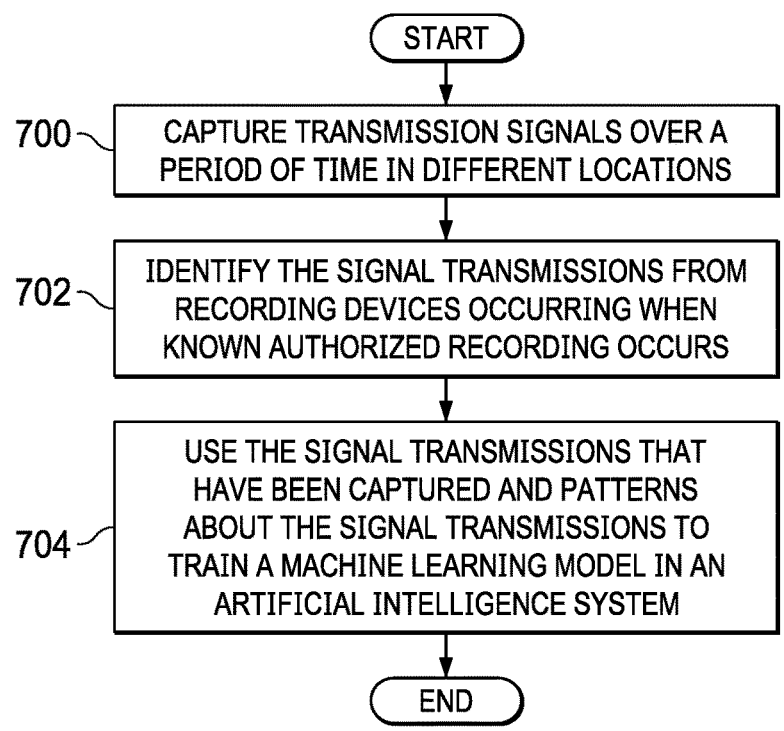
FIG. 7 is a flowchart of a process for creating historical data for use in recording device detection in accordance with an illustrative embodiment.

With reference next to FIG. 7, a flowchart of a process for creating historical data for use in recording device detection is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in detection manager 210 in computer system 208 in FIG. 2. In this example, detection manager 210 can be software installed in a user device, such as computing device 216 in FIG. 2.

The process begins by capturing signal transmissions over a period of time in different locations (step 700). In step 700, the process examines signals in different locations where the user device moves during the period of time. This step captures information about all available networks and wireless protocols that may be present.

The process identifies the signal transmissions from recording devices occurring when known authorized recording occurs (step 702). For example, the process can identify signal transmissions when the user devices are being used for machine to machine (M2) communication. The user device can identify when a call is being made in which the other device is a recording device having recording capabilities through a trusted connection. A pattern in the signal transmissions can be identified both for when the recording does not occur and when the recording does occur with the device. This pattern can be stored as part of historical signal transmissions for use in determining when that recording device is in an active state or in an inactive state.

As another example, the user device can be paired with a recording device such as a web cam. The process can determine from the signal transmissions when the user indicates that the web cam is about to be turned on. For example, the user may ask "do I have permission to record this videoconference?" Signal fluctuations associated with powering up and down recording devices can also be used to determine whether a recording device is in an active state for recording.

The process uses the signal transmissions that have been captured and patterns about the signal transmissions to train a machine learning model in an artificial intelligence system (step 704). The process terminates thereafter.

The process illustrated in FIG. 7 can be performed in many different user devices to collect historical signal transmissions and identify patterns from those historical signal transmissions. This collection of data can be transmitted from different user devices to a database or data store for crowdsourcing and aggregation of historical signal transmissions from many devices for many users. In this manner, a single device does not have to encounter a particular type of recording device to recognize that that recording device may be in an active state for recording the user.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, the flowchart in FIG. 5 can also determine the set of recording devices based on the capabilities of the recording devices in the active state. The capabilities can be used to determine whether the user can be recorded by a recording device. For example, a microphone in an adjacent room may be unable to record the user because the sensitivity of the microphone is too low to generate audio data for a user conversation in the location. As another example, a video camera may be unable to record a user because the orientation of the camera results in the user being out of the field-of-view of the video camera.

As another example, the process in FIG. 6 identifies recording devices that are recording and sending data that warrants generating an alert for a user. The process can be modified to apply to detecting recording devices that may be recording and not transmitting data or recording devices that are not yet recording but are preparing to record a user in a location.

Figure 8:
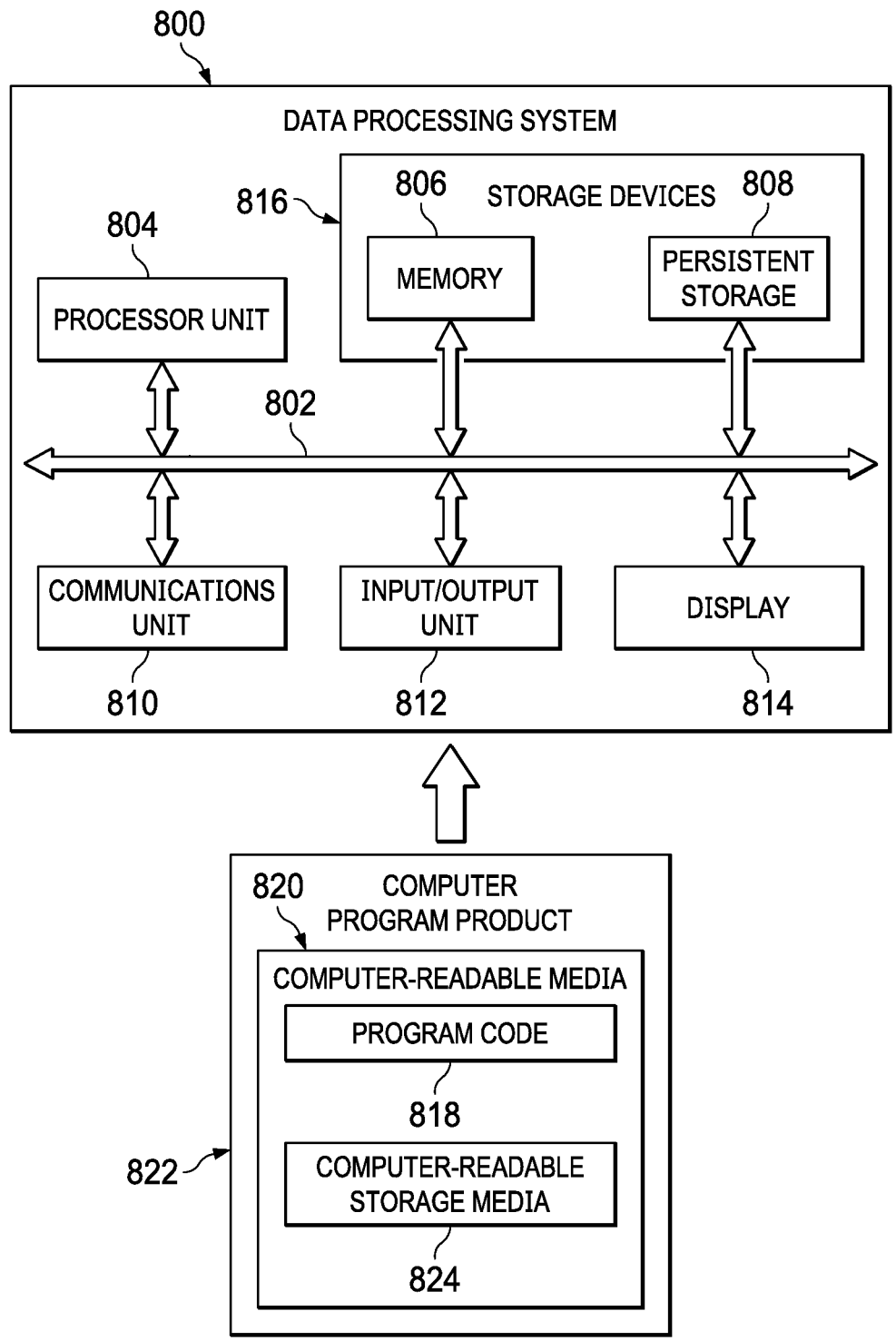
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Data processing system 800 can also be used to implement computer system 208, which comprises one or more data processing systems such as computing device 216 and network device 218 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can may be implemented using one or more heterogeneous processor systems in which a main processor is present with secondary processors on a single chip. As another illustrative example, processor unit 804 can be a symmetric multi-processor system containing multiple processors of the same type on a single chip.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media. The computer-readable signal media can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in one data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of, another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

Thus, illustrative embodiments of the present invention provide a computer implemented method, computer system, and computer program product for protecting user confidentiality. Signal transmissions in a location in which a user is present are monitored by a computer system. A set of recording devices in an active state for recording the user in the location is identified by the computer system based on patterns in the signal transmissions monitored in the location. A set of alerts notifying the user of the set of recording devices in the active state for recording the user is generated by the computer system.

As a result, a user can perform work or other activities in different locations with increased confidence that the user is not being recorded when recording is undesired. With one or more illustrative examples, signal transmissions in a location of a user can be monitored and analyzed to determine whether recording devices are present using the signal transmissions. Further, the analysis of patterns within the signal transmissions can be used to generate real-time alerts to let a user know that recording devices are present that can or are recording the user. The alert can also include suggestions to increase confidentiality for the user.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for protecting user confidentiality, the method comprising:
    monitoring, by a computer system, signal transmissions in a location in which a user is present;
    identifying, by the computer system, a set of recording devices in an active state for recording the user in the location based on patterns in the signal transmissions monitored in the location; and
    generating, by the computer system, a set of alerts notifying the user of the set of recording devices in the active state for recording the user, wherein the set of alerts includes a set of suggested actions selected from at least one of moving to another room, reducing a volume in talking, covering a camera in a recording device, or disconnecting the recording device from a power source.

2. The method of claim 1, wherein monitoring, by the computer system, the signal transmissions in the location in which the user is present comprises:
    monitoring, by the computer system, at least one of signal strengths of the signal transmissions or data in the signal transmissions monitored in the location in which the user is present.

3. The method of claim 1, wherein identifying, by the computer system, the set of recording devices in the active state for recording the user in the location based on the patterns in the signal transmissions monitored in the location comprises:
    identifying, by the computer system, recording devices from the signal transmissions monitored in the location;
    determining, by the computer system, states for the recording devices identified using the patterns in the signal transmissions; and
    identifying, by the computer system, the set of recording devices from the recording devices based on the states determined for the recording devices in which the set of recording devices have the active state for recording.

4. The method of claim 3, wherein identifying, by the computer system, the set of recording devices from the recording devices based on the states determined for the recording devices in which the set of recording devices have the active state for recording comprises:
    identifying, by the computer system, the set of recording devices from the recording devices based on the states determined for the recording devices in which the set of recording devices have the active state for recording and based on a confidentiality level for the user.

5. The method of claim 1, wherein identifying, by the computer system, the set of recording devices in the active state for recording the user in the location based on the patterns in the signal transmissions monitored in the location comprises:
    identifying, by the computer system, the set of recording devices in the active state for recording the user in the location based on the patterns in the signal transmissions using an artificial intelligence system trained using historical data containing historical signal transmissions from recording devices.

6. method of claim 1, wherein the set of alerts comprises at least one of a visual alert, an audio alert, displaying an alert on a device associated with user in the location and wherein the set of alerts include at least one of a device identifier, an adjacency level, a predicted content type recorded, a security certificate, or a validation certificate for each recording device in the set of recording devices.

7. The method of claim 1 further comprising:
    preventing, by the computer system, a recording device in the set of recording devices from transmitting data.

8. The method of claim 1, wherein the set of recording devices is selected from at least one of an Internet of Things device, a video capture device, an audio capture device, mobile phone, a laptop computer, a table computer, a Raspberry Pi computer, a camera, a webcam, a smart speaker, a smart television, or a smart sensor.

9. A recording detection system comprising:
a computer system that monitors signal transmissions in a location in which a user is present; identifies a set of recording devices in an active state for recording the user in the location based on patterns in the signal transmissions monitored in the location; and
generates a set of alerts notifying the user of the set of recording devices in the active state for recording the user, wherein the set of alerts includes a set of suggested actions selected from at least one of moving to another room, reducing a volume in talking, covering a camera in a recording device, or disconnecting the recording device from a power source.

10. The recording detection system of claim 9, wherein in monitoring the signal transmissions in the location in which the user is present, the computer system monitors at least one of signal strengths of the signal transmissions or data in the signal transmissions monitored in the location in which the user is present.

11. The recording detection system of claim 9, wherein in identifying the set of recording devices in the active state for recording the user in the location based on the patterns in the signal transmissions monitored in the location, the computer system identifies recording devices from the signal transmissions monitored in the location;
determines states for the recording devices identified using the patterns in the signal transmissions; and
identifies the set of recording devices from the recording devices based on the states determined for the recording devices in which the set of recording devices have the active state for recording.

12. The recording detection system of claim 11, wherein in identifying the set of recording devices from the recording devices based on the states determined for the recording devices in which the set of recording devices have the active state for recording, the computer system identifies the set of recording devices from the recording devices based on the states determined for the recording devices in which the set of recording devices have the active state for recording and based on a confidentiality level for the user.

13. The recording detection system of claim 9, wherein in identifying the set of recording devices in the active state for recording the user in the location based on the patterns in the signal transmissions monitored in the location, the computer system identifies the set of recording devices in the active state for recording the user in the location based on the patterns in the signal transmissions using an artificial intelligence system trained using historical data containing historical signal transmissions from recording devices.

14. The recording detection system of claim 9, wherein the set of alerts comprises at least one of a visual alert, an audio alert, displaying an alert on a device associated with user in the location and wherein the set of alerts include at least one of a device identifier, an adjacency level, a predicted content type recorded, a security certificate, or a validation certificate for each recording device in the set of recording devices.

15. A computer program product for protecting user confidentiality, the computer program product comprising:
a computer-readable storage media;
first program code, stored on the computer-readable storage media, executable by a computer system to cause the computer system to monitor signal transmissions in a location in which a user is present;
second program code, stored on the computer-readable storage media, executable by the computer system to cause the computer system to identify a set of recording devices in an active state for recording the user in the location based on patterns in the signal transmissions monitored in the location; and
third program code, stored on the computer-readable storage media, executable by the computer system to cause the computer system to generate a set of alerts notifying the user of the set of recording devices in the active state for recording the user, wherein the set of alerts includes a set of suggested actions selected from at least one of moving to another room, reducing a volume in talking, covering a camera in a recording device, or disconnecting the recording device from a power source.

16. The computer program product of claim 15, wherein the first program code comprises:
program code, stored on the computer-readable storage media, executable by the computer system to cause the computer system to monitor at least one of signal strengths of the signal transmissions or data in the signal transmissions monitored in the location in which the user is present.

17. The computer program product of claim 15, wherein the second program code comprises:
program code, stored on the computer-readable storage media, executable by the computer system to cause the computer system to identify recording devices from the signal transmissions monitored in the location;
program code, stored on the computer-readable storage media, executable by the computer system to cause the computer system to determine states for the recording devices identified using the patterns in the signal transmissions; and
program code, stored on the computer-readable storage media, executable by the computer system to cause the computer system to identify the set of recording devices from the recording devices based on the states determined for the recording devices in which the set of recording devices have the active state for recording.

18. The computer program product of claim 15, wherein the second program code comprises:
program code, stored on the computer-readable storage media, executable by the computer system to cause the computer system to identify the set of recording devices in the active state for recording the user in the location based on the patterns in the signal transmissions using an artificial intelligence system trained using historical data containing historical signal transmissions from recording devices.

* * * * *